US012309277B2

(12) United States Patent
Jain et al.

(10) Patent No.: US 12,309,277 B2
(45) Date of Patent: May 20, 2025

(54) DOMAIN SPECIFIC TOKENS FOR REDUCED TOKEN GENERATION

(71) Applicant: Bank of America Corporation, Charlotte, NC (US)

(72) Inventors: Jeetendra Hukmichand Jain, Charlotte, NC (US); Bradley Holland, Huntersville, NC (US); James Loney, Charlotte, NC (US); Vineet Agarwal, Simi Valley, CA (US)

(73) Assignee: Bank of America Corporation, Charlotte, NC (US)

( * ) Notice: Subject to any disclaimer, the term of this patent is extended or adjusted under 35 U.S.C. 154(b) by 199 days.

(21) Appl. No.: 18/107,710

(22) Filed: Feb. 9, 2023

(65) Prior Publication Data

US 2024/0275595 A1  Aug. 15, 2024

(51) Int. Cl.
*H04L 9/32* (2006.01)

(52) U.S. Cl.
CPC .......... *H04L 9/3213* (2013.01); *H04L 9/3228* (2013.01)

(58) Field of Classification Search
CPC ............. H04L 9/3213; H04L 9/3228
USPC ........................................... 713/155
See application file for complete search history.

(56) References Cited

U.S. PATENT DOCUMENTS

| 9,424,574 | B2 * | 8/2016 | Bondesen | ........ G06Q 20/3821 |
| 10,402,808 | B1 * | 9/2019 | Peterson | ........ G06Q 20/381 |
| 11,315,137 | B1 | 4/2022 | Kurani et al. | |
| 11,423,395 | B1 | 8/2022 | Kurani et al. | |
| 11,658,965 | B2 * | 5/2023 | Fenichel | ........ H04L 63/0853 |
| | | | | 726/6 |
| 11,757,896 | B1 * | 9/2023 | Gupta | ........ H04L 63/102 |
| | | | | 726/4 |
| 2009/0254462 | A1 * | 10/2009 | Tomchek | ........ G06Q 20/405 |
| | | | | 707/E17.014 |
| 2011/0191236 | A1 | 8/2011 | Cummings et al. | |
| 2013/0198851 | A1 * | 8/2013 | Spies | ........ G06Q 99/00 |
| | | | | 726/26 |
| 2014/0018136 | A1 | 1/2014 | Sai et al. | |
| 2014/0019352 | A1 | 1/2014 | Shrivastava | |
| 2014/0046853 | A1 * | 2/2014 | Spies | ........ H04L 9/0897 |
| | | | | 705/51 |
| 2014/0337227 | A1 | 11/2014 | Dua | |
| 2015/0142657 | A1 | 5/2015 | Sagastiverza et al. | |
| 2015/0161382 | A1 | 6/2015 | Boivie et al. | |
| 2015/0161596 | A1 * | 6/2015 | McCarthy | ........ G06Q 20/02 |
| | | | | 705/67 |

(Continued)

*Primary Examiner* — Thanh T Le
(74) *Attorney, Agent, or Firm* — Banner & Witcoff, Ltd.

(57) ABSTRACT

Aspects of the disclosure relate to virtual tokens. A computing platform may generate a domain specific token, corresponding to a card number and having an approved users list. The computing platform may receive, from a first enterprise device corresponding to a first enterprise, card information of a card. The computing platform may identify that tokenization of the card information is approved by a second enterprise corresponding to the card. Based on identifying that the tokenization is approved, the computing platform may modify the approved users list to include the first enterprise. The computing platform may send, to the first enterprise device, the first domain specific token, where the computing platform is configured to validate an event processing request based on receipt of the first domain specific token from the first enterprise device.

20 Claims, 11 Drawing Sheets

(56) References Cited

U.S. PATENT DOCUMENTS

| | | |
|---|---|---|
| 2015/0186872 A1 | 7/2015 | Sobol et al. |
| 2015/0262161 A1 | 9/2015 | McMullan et al. |
| 2015/0312038 A1* | 10/2015 | Palanisamy .......... G06Q 20/385 713/155 |
| 2015/0319158 A1* | 11/2015 | Kumnick ........... G06Q 20/4016 726/9 |
| 2015/0332266 A1 | 11/2015 | Friedlander et al. |
| 2016/0119296 A1* | 4/2016 | Laxminarayanan .. H04L 9/0822 713/168 |
| 2017/0103388 A1* | 4/2017 | Pillai ................. G06Q 20/3823 |
| 2017/0311161 A1 | 10/2017 | Kuenzi |
| 2017/0345237 A1 | 11/2017 | Kuenzi et al. |
| 2017/0372298 A1 | 12/2017 | Zhu et al. |
| 2018/0341935 A1* | 11/2018 | Lindfeldt ................. H04W 4/00 |
| 2018/0374088 A1 | 12/2018 | Fonseca et al. |
| 2019/0295074 A1* | 9/2019 | Carrott ............... H04L 63/0838 |
| 2019/0340599 A1* | 11/2019 | Lovett ................... H04W 12/63 |
| 2020/0094134 A1 | 3/2020 | Marchesi et al. |
| 2020/0106752 A1* | 4/2020 | Rule .................. H04L 63/0853 |
| 2020/0111102 A1* | 4/2020 | Vukich .............. G06Q 20/40145 |
| 2020/0151724 A1* | 5/2020 | Edwards .......... G06Q 20/38215 |
| 2020/0175154 A1* | 6/2020 | Ratnakaram ............ G06F 21/54 |
| 2020/0234300 A1* | 7/2020 | Vukich .............. G06Q 20/3552 |
| 2020/0265415 A1 | 8/2020 | Chattopadhyay et al. |
| 2021/0174355 A1* | 6/2021 | Gupta .................. G06Q 20/385 |
| 2021/0182863 A1* | 6/2021 | Doraiswamy .......... G06Q 20/02 |
| 2021/0391994 A1* | 12/2021 | Johnson ................ H04L 9/0866 |
| 2022/0147648 A1* | 5/2022 | Babcock ............. G06F 21/6245 |
| 2022/0180357 A1 | 6/2022 | Chattopadhyay et al. |
| 2022/0188391 A1* | 6/2022 | Pai ....................... G06Q 20/405 |
| 2022/0207526 A1* | 6/2022 | Wieker ................ H04W 12/068 |
| 2022/0209952 A1* | 6/2022 | Rapolu .................. H04L 9/3213 |
| 2022/0222663 A1* | 7/2022 | Plomske ........... G06Q 20/38215 |
| 2022/0366411 A1 | 11/2022 | Bajwa et al. |
| 2023/0013294 A1 | 1/2023 | Natarajan et al. |
| 2023/0078140 A1* | 3/2023 | Johnson ................ H04L 9/3213 713/186 |
| 2023/0119385 A1* | 4/2023 | Fenichel ............. H04L 63/0876 726/6 |
| 2023/0205859 A1* | 6/2023 | Pai ....................... G06Q 20/425 726/7 |
| 2024/0127240 A1* | 4/2024 | Abraham ............. G06Q 20/102 |

* cited by examiner

305

Approval Notification

The virtual token has been validated – you are free to process the client request.

Denial Notification

Use of the virtual token has been denied – please try again or provide alternative credentials.

FIG. 4

DOMAIN SPECIFIC TOKENS FOR REDUCED TOKEN GENERATION

BACKGROUND

Aspects of the disclosure relate to the generation and use of virtual tokens. In some instances, virtual tokens may be used to replace the storage of sensitive information (e.g., card numbers, or the like). By storing the virtual tokens rather than the information itself, security of the information may be enhanced. To generate such virtual tokens, an information set (e.g., card number) may be provided, and a virtual token may be created to represent that information set. Similarly, if a second information set is received, a second virtual token may be created to represent the second information set. Such one to one generation of virtual tokens for the information that they represent may, in some instances, be an inefficient use of such virtual tokens. For example, the virtual tokens may be numeric representations of a particular amount of digits. Accordingly, only a finite number of such virtual tokens may be produced before all available numbers have been exhausted. With the increased reliance on such virtual tokens, it may be important to develop alternative methods for generating and using such virtual tokens to, for instance, reduce the number of generated tokens (e.g., to prevent or at least delay the depletion of the finite number of virtual tokens available for use).

SUMMARY

Aspects of the disclosure provide effective, efficient, scalable, and convenient technical solutions that address and overcome the technical problems associated with generating and assigning virtual tokens. In accordance with one or more embodiments of the disclosure, a computing platform comprising at least one processor, a communication interface, and memory storing computer-readable instructions may generate a plurality of domain specific tokens, including a first domain specific token, where each domain specific token corresponds to a card number and has an approved users list. The computing platform may receive, from a first enterprise device corresponding to a first enterprise, card information of a card. The computing platform may identify that tokenization of the card information is approved by a second enterprise corresponding to the card. Based on identifying that the tokenization is approved, the computing platform may modify the approved users list for the first domain specific token to include the first enterprise, where the first enterprise may correspond to a first domain of the first domain specific token, and where the approved users list may include at least one other enterprise corresponding to the first domain. The computing platform may send, to the first enterprise device, the first domain specific token, where the first domain specific token may be configured for storage at the first enterprise device along with at least a portion of the card information, and where the computing platform may be configured to validate an event processing request based on receipt of the first domain specific token from the first enterprise device or the at least one other enterprise corresponding to the first domain.

In one or more instances, the first enterprise may be a token user and the second enterprise may be a financial institution. In one or more instances, the plurality of domain specific tokens may be generated in response to a request from the second enterprise.

In one or more examples, the first domain specific token may correspond to one of: a device domain or a merchant domain. In one or more examples, the computing platform may receive, from the first enterprise device and along with the card information, domain information identifying that the first enterprise corresponds to the first domain.

In one or more instances, the card information may identify that the second enterprise corresponds to the card. In one or more instances, the computing platform may synchronize the approved users list for the first domain specific token with a second enterprise device of the second enterprise.

In one or more examples, the computing platform may receive, from the first enterprise device, the first domain specific token and a request for authorization to process the event processing request, where the first domain specific token and the request for authorization to process the event processing request may be sent by the first enterprise device in response to receiving the event processing request. In one or more examples, the computing platform may forward, to the second enterprise device, the first domain specific token, an identifier of the first enterprise, and the request for authorization to process the event processing request.

In one or more instances, the second enterprise device may verify use of the first domain specific token by the first enterprise using the approved users list for the first domain specific token, and send, to the computing platform, a notification indicating whether or not the request for authorization to process the event processing request is approved. In one or more instances, based on receiving a notification indicating that the request for authorization to process the event processing request is approved, the computing platform may send one or more commands directing the first enterprise device to process the event processing request. Based on receiving a notification indicating that the request for authorization to process the event processing request is not approved, the computing platform may send one or more commands directing the first enterprise device to display the notification indicating that the request for authorization to process the event processing request is not approved.

In one or more examples, the computing platform may receive a request to revoke authorization for the first enterprise to use the first domain specific token. The computing platform may remove the first enterprise from the approved users list for the first domain specific token, which may cause authorization for use of the first domain specific token by the first enterprise to be denied and cause authorization for use of the first domain specific token by the at least one other enterprise to continue to be approved.

In one or more instances, the computing platform may receive a request to temporarily suspend authorization for the first enterprise to use the first domain specific token. The computing platform may temporarily remove the first enterprise from the approved users list for the first domain specific token, which may cause authorization for use of the first domain specific token by the first enterprise to be denied and cause authorization for use of the first domain specific token by the at least one other enterprise to continue to be approved. The computing platform may receive a request to resume the authorization for the first enterprise to use the first domain specific token. The computing platform may add the first enterprise back to the approved users list for the first domain specific token.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3 and 4 depict illustrative user interfaces for generating and managing domain specific tokens to improve token efficiency in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for improved virtual token generation and management are described herein. For example, the use of tokens (e.g., virtual cards) for transaction processing has exponentially grown. For example, ecommerce companies, online merchants, device companies with virtual wallets, and/or other enterprises may use such virtual cards, as storage of such virtual cards may be less risky for these enterprises (and thus, in turn, better for customers). Accordingly, card issuing banks, card networks, and token requestors may have to maintain and manage a large set of data. However, there may be a limited number of such tokens available (e.g., due to the numeric constraints on such tokens), and thus, it may be important to limit the number of tokens generated to conserve available tokens for future use.

Accordingly, described herein is a solution that replaces networks (e.g., credit card companies) with a token issuer. For each card (new or existing), N tokens may be created based on a domain (e.g., device, ecommerce, merchant, or the like) rather than tied to a token requestor identifier ("TRID"). Tokenization may happen when bank clients and/or issuers may push requests directly to merchants (if such relationships exist) but only one token may be provided per domain (e.g., all merchants may receive the same token). The transaction may be tracked and controlled based on TRID rather than the token. Security may remain intact with only the issuer and network knowing about the funding primary account number ("FPAN"). TRID and token events (e.g., create, lock, unlock, FPAN change, delete, or the like) may be pushed to a cloud queue for controlled consumption by stakeholders (e.g., issuer, token requestor, network, processor, or the like). As a result, the number of tokens needed to perform authentication may be reduced, yet the benefits of tokenization may be maintained.

Figure 1A:
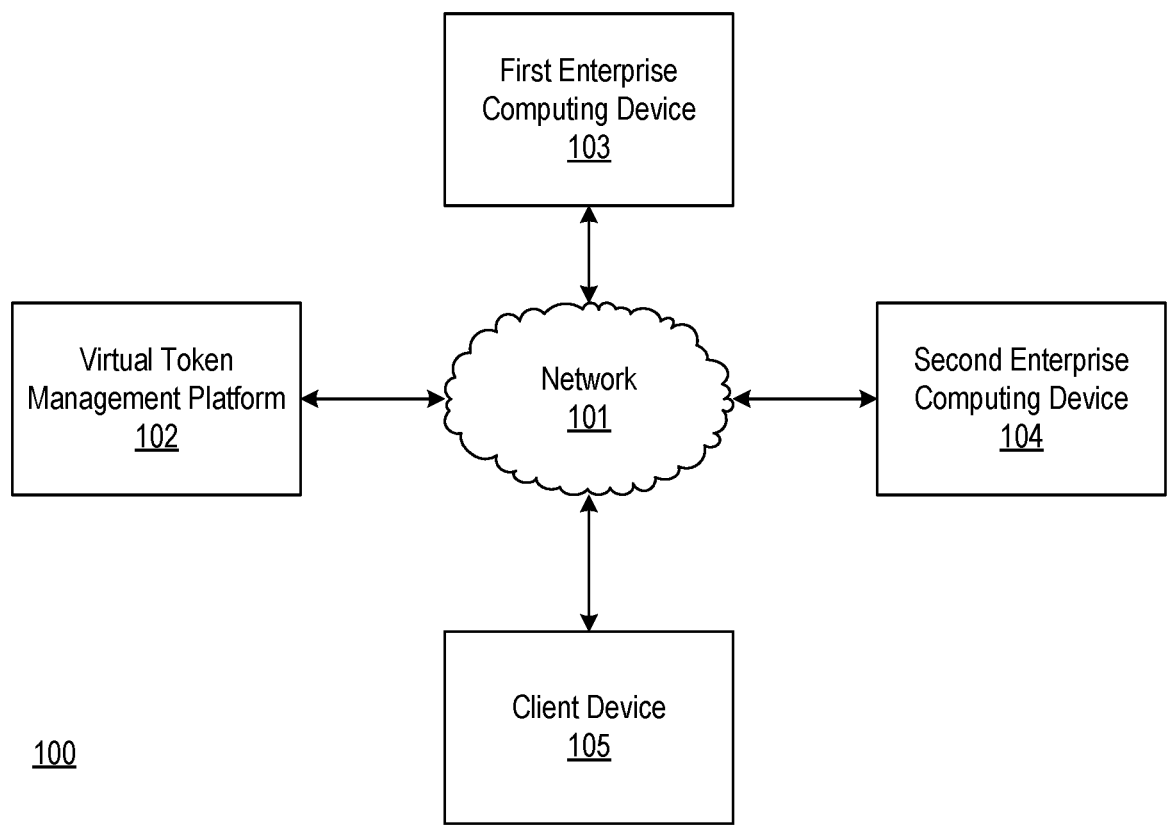
FIGS. 1A-1B depict an illustrative computing environment for generating and managing domain specific tokens to improve token efficiency in accordance with one or more example embodiments.
Figure 1B:
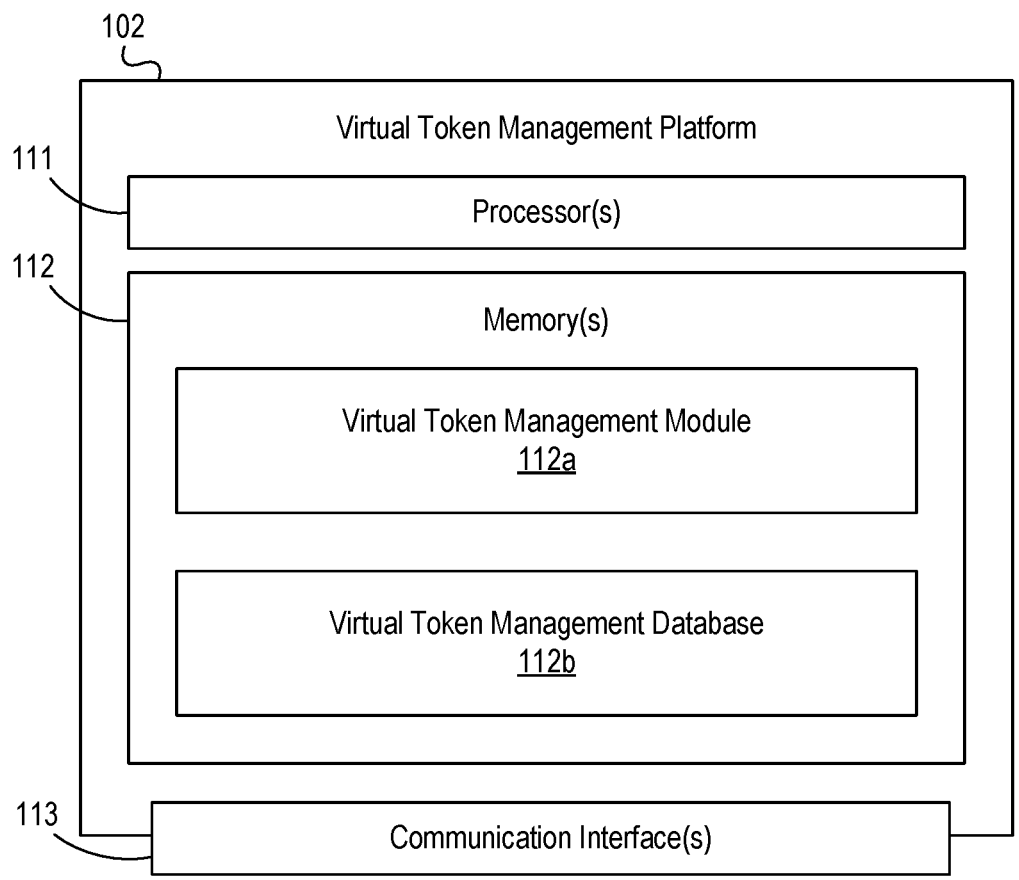

FIGS. 1A-1B depict an illustrative computing environment for generating and managing domain specific tokens to improve token efficiency in accordance with one or more example embodiments. Referring to FIG. 1A, computing environment 100 may include one or more computer systems. For example, computing environment 100 may include a virtual token management platform 102, first enterprise computing device 103, second enterprise computing device 104, and client device 105.

As described further below, virtual token management platform 102 may be a computer system that includes one or more computing devices (e.g., servers, server blades, or the like) and/or other computer components (e.g., processors, memories, communication interfaces) that may be used to provide virtual token generation and management services as described further below. For example, virtual token management platform 102 may be configured to generate domain specific tokens, each with a corresponding authorized user list. Accordingly, the virtual token management platform 102 may use a single token to provide authorization to a group of users (e.g., each corresponding to a common domain, such as merchants, devices, or the like). The virtual token management platform 102 may be configured to dynamically manage these authorized user lists so as to grant, revoke, and/or temporarily suspend authorization to a given user.

First enterprise computing device 103 may be and/or otherwise include a laptop computer, desktop computer, mobile device, tablet, smartphone, server, server blade, and/or other device that may be used to approve tokenization and/or provide token validation services on behalf of an enterprise organization, such as a financial institution.

Second enterprise computing device 104 may be and/or otherwise include a laptop computer, desktop computer, mobile device, tablet, smartphone, server, server blade, and/or other device that may be used to request and/or otherwise store virtual tokens on behalf of a token user (e.g., such as a merchant, device company, and/or enterprise corresponding to an alternative domain). In some instances, second enterprise computing device 104 may be configured to display one or more user interfaces (e.g., authorization approval interfaces, authorization denial interfaces, or the like).

Although first enterprise computing device 103 (e.g., on behalf of a financial institution) and second enterprise computing device 104 (e.g., on behalf of a token user) are shown, any number of enterprise user devices may be deployed (e.g., on behalf of financial institutions and/or token users) without departing from the scope of the disclosure.

Client device 105 may be and/or otherwise include a laptop computer, desktop computer, mobile device, tablet, smartphone, and/or other device that may be used to provide client requests (e.g., customer orders, and/or other requests) to be processed using the domain specific tokens. In some instances, client device 105 may be configured to display one or more user interfaces (e.g., order processing confirmations, token modification interfaces, or the like). Although a single client device 105 is shown, any number of client devices 105 may be deployed without departing from the scope of the disclosure.

Computing environment 100 also may include one or more networks, which may interconnect virtual token management platform 102, first enterprise computing device 103, second enterprise computing device 104, and client device 105. For example, computing environment 100 may include a network 101 (which may interconnect, e.g., virtual token management platform 102, first enterprise computing device 103, second enterprise computing device 104, and client device 105).

In one or more arrangements, virtual token management platform 102, first enterprise computing device 103, second enterprise computing device 104, and client device 105 may be any type of computing device capable of sending and/or receiving requests and processing the requests accordingly. For example, virtual token management platform 102, first enterprise computing device 103, second enterprise computing device 104, client device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of virtual token management platform 102, first enterprise computing device 103, second enterprise computing device 104, and client device 105 may, in some instances, be special-purpose computing devices configured to perform specific functions.

Referring to FIG. 1B, virtual token management platform 102 may include one or more processors 111, memory 112, and communication interface 113. A data bus may interconnect processor 111, memory 112, and communication interface 113. Communication interface 113 may be a network interface configured to support communication between virtual token management platform 102 and one or more networks (e.g., network 101, or the like). Memory 112 may include one or more program modules having instructions that when executed by processor 111 cause virtual token management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of virtual token management platform 102 and/or by different computing devices that may form and/or otherwise make up virtual token management platform 102. For example, memory 112 may have, host, store, and/or include virtual token management module 112a and virtual token management database 112b.

Virtual token management module 112a may have instructions that direct and/or cause virtual token management platform 102 to provide improved token generation and management methods, as discussed in greater detail below. Virtual token management database 112b may store information used by virtual token management module 112a and/or virtual token management platform 102 in application of advanced techniques to provide improved token generation, token management, and/or in performing other functions.

Figure 2A:
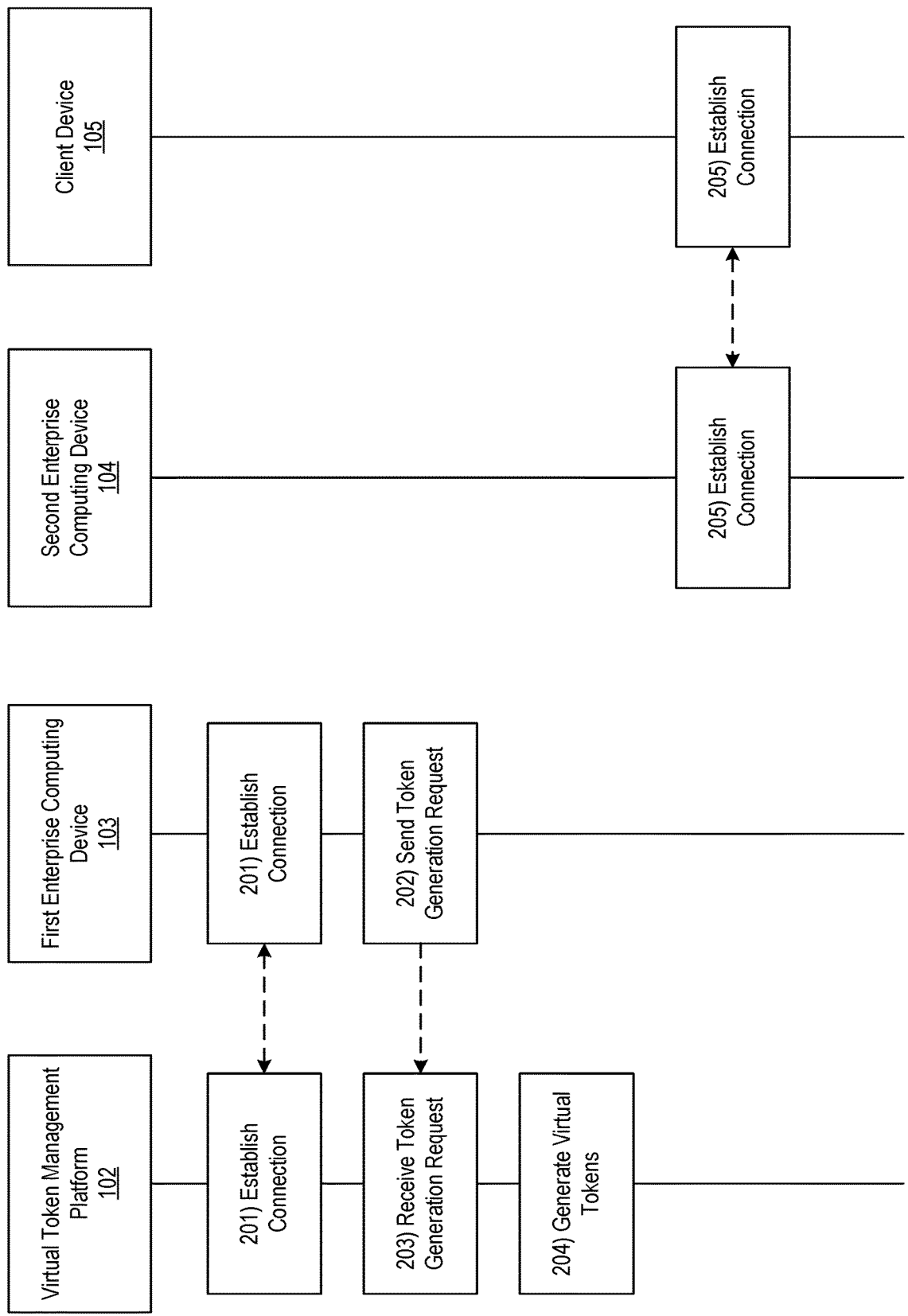
FIGS. 2A-2G depict an illustrative event sequence for generating and managing domain specific tokens to improve token efficiency in accordance with one or more example embodiments.

FIGS. 2A-2G depict an illustrative event sequence for generating and managing domain specific tokens to improve token efficiency in accordance with one or more example embodiments. Referring to FIG. 2A, at step 201, the first enterprise computing device 103 may establish a connection with the virtual token management platform 102. For example, the first enterprise computing device 103 may establish a first wireless data connection with the virtual token management platform 102 to link the first enterprise computing device 103 (e.g., in preparation for sending token generation requests and/or otherwise communicating with the virtual token management platform 102). In some instances, the first enterprise computing device 103 may identify whether or not a connection is already established with the virtual token management platform 102. If a connection is already established with the virtual token management platform 102, the first enterprise computing device 103 might not re-establish the connection. Otherwise, if a connection is not yet established with the virtual token management platform 102, the first enterprise computing device 103 may establish the first wireless data connection as described herein.

At step 202, the first enterprise computing device 103 may send a token generation request to the virtual token management platform 102. For example, the first enterprise computing device 103 may be affiliated with a financial institution that may offer various financial instruments (such as credit cards, debit cards, and/or other instruments). For each type of financial instrument, the first enterprise computing device 103 may send a request for virtual tokens to be generated, which may, e.g., be virtual cards configured to represent the physical financial instruments. Additionally or alternatively, the first enterprise computing device 103 may send the token generation request to request a token on behalf of a given domain (e.g., ecommerce, merchant, device, and/or other domain). In some instances, the first enterprise computing device 103 may send the token generation request to the virtual token management platform 102 while the first wireless data connection is established.

At step 203, the virtual token management platform 102 may receive the token generation request sent at step 202. For example, the virtual token management platform 102 may receive the token generation request via the communication interface 113 and while the first wireless data connection is established.

At step 204, the virtual token management platform 102 may generate virtual tokens for each requested financial instrument. For example, if the first enterprise computing device 103 sends a request to generate virtual tokens for multiple different types of financial instruments (e.g., two different types of credit cards supported by the first enterprise, such as cards that offer different cash back promotions and may cost different amounts annually accordingly), the virtual token management platform 102 may generate virtual tokens for each instrument. In generating the virtual tokens for each financial instrument, the virtual token management platform 102 may generate a plurality of unassigned virtual tokens, each corresponding to a particular domain of a token user (e.g., device, ecommerce, merchant, and/or other domains). For each of the virtual tokens, the virtual token management platform 102 may also generate an authorized user list (which, at the time of the creation of the virtual tokens, may be empty). In some instances, the virtual token management platform 102 may generate the virtual tokens in response to the token generation request.

At step 205, the client device 105 may establish a connection with the second enterprise user device 104. For example, the client device 105 may establish a second wireless data connection with the second enterprise user device 104 to link the client device 105 to the second enterprise user device 104 (e.g., in preparation for sending card information, client requests, and/or otherwise communicating with the second enterprise user device 104). In some instances, the client device 105 may identify whether or not a connection is already established with the second enterprise user device 104. If a connection is already established with the second enterprise user device 104, the client device 105 might not re-establish the connection. Otherwise, if a connection is not yet established with the second enterprise user device 104, the client device 105 may establish the second wireless data connection as described herein.

Figure 2B:
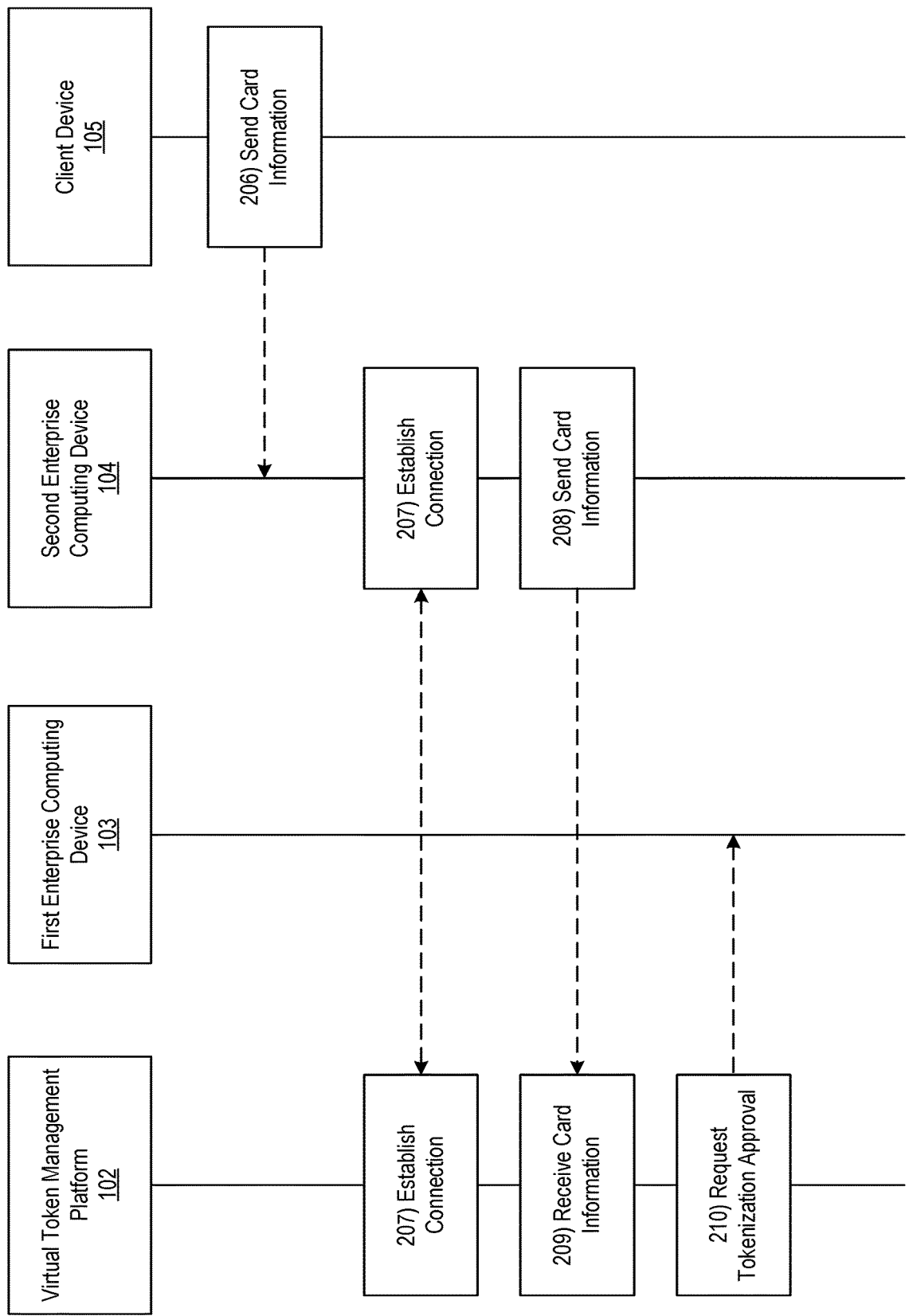

Referring to FIG. 2B, at step 206, client device 105 may send card information for a particular card. For example, a particular financial instrument may have been issued by the first enterprise to the user of the client device 105. In these instances, the user may wish to store the card information with the second enterprise (e.g., to facilitate the purchase of goods, services, and/or otherwise). Accordingly, the client device 105 may send the card information to the second enterprise computing device 104. In some instances, the client device 105 may send the card information to the second enterprise computing device 104 while the second wireless data connection is established.

At step 207, the second enterprise computing device 104 may establish a connection with the virtual token management platform 102. For example, the second enterprise computing device 104 may establish a third wireless data connection with the virtual token management platform 102 to link the second enterprise computing device 104 to the virtual token management platform 102 (e.g., in preparation for sending card information and/or otherwise communicating with the virtual token management platform 102). In some instances, the second enterprise computing device 104 may identify whether a connection is already established with the virtual token management platform 102. If a connection is already established with the virtual token management platform 102, the second enterprise computing device 104 might not re-establish the connection. Otherwise, if a connection is not yet established with the virtual token management platform 102, the second enterprise computing device 104 may establish the third wireless data connection as described herein.

At step 208, the second enterprise computing device 104 may forward the card information (sent by the client device 105 at step 206) to the virtual token management platform 102. For example, the second enterprise computing device 104 may forward the card information to the virtual token management platform 102 while the third wireless data connection is established. In some instances, the second enterprise computing device 104 may also send a request for a virtual token. As a particular example, the card information may represent a physical credit card, and the second enterprise may be a device manufacturer that provides an electronic wallet. Rather than storing the information of the physical credit card itself (e.g., the card information), the second enterprise may request a virtual card (e.g., a virtual token) that may be stored instead (and that is representative of the physical credit card).

At step 209, the virtual token management platform 102 may receive the card information sent at step 208. For example, the virtual token management platform 102 may receive the card information via the communication interface 113 and while the third wireless data connection is established. In some instances, the card information may identify that the first enterprise (e.g., corresponding to the first enterprise computing device 103) provides services corresponding to the corresponding card (e.g., the first enterprise may be a financial institution that supports the card, or the like).

At step 210, the virtual token management platform 102 may request tokenization approval from the first enterprise computing device 103. For example, the virtual token management platform 102 may request, from the first enterprise computing device 103, whether or not tokenization of the card information, received at step 209, is approved (e.g., by the financial institution) for the second enterprise. In some instances, the virtual token management platform 102 may request tokenization approval from the first enterprise computing device 103 via the communication interface 113 and while the first wireless data connection is established.

Figure 2C:
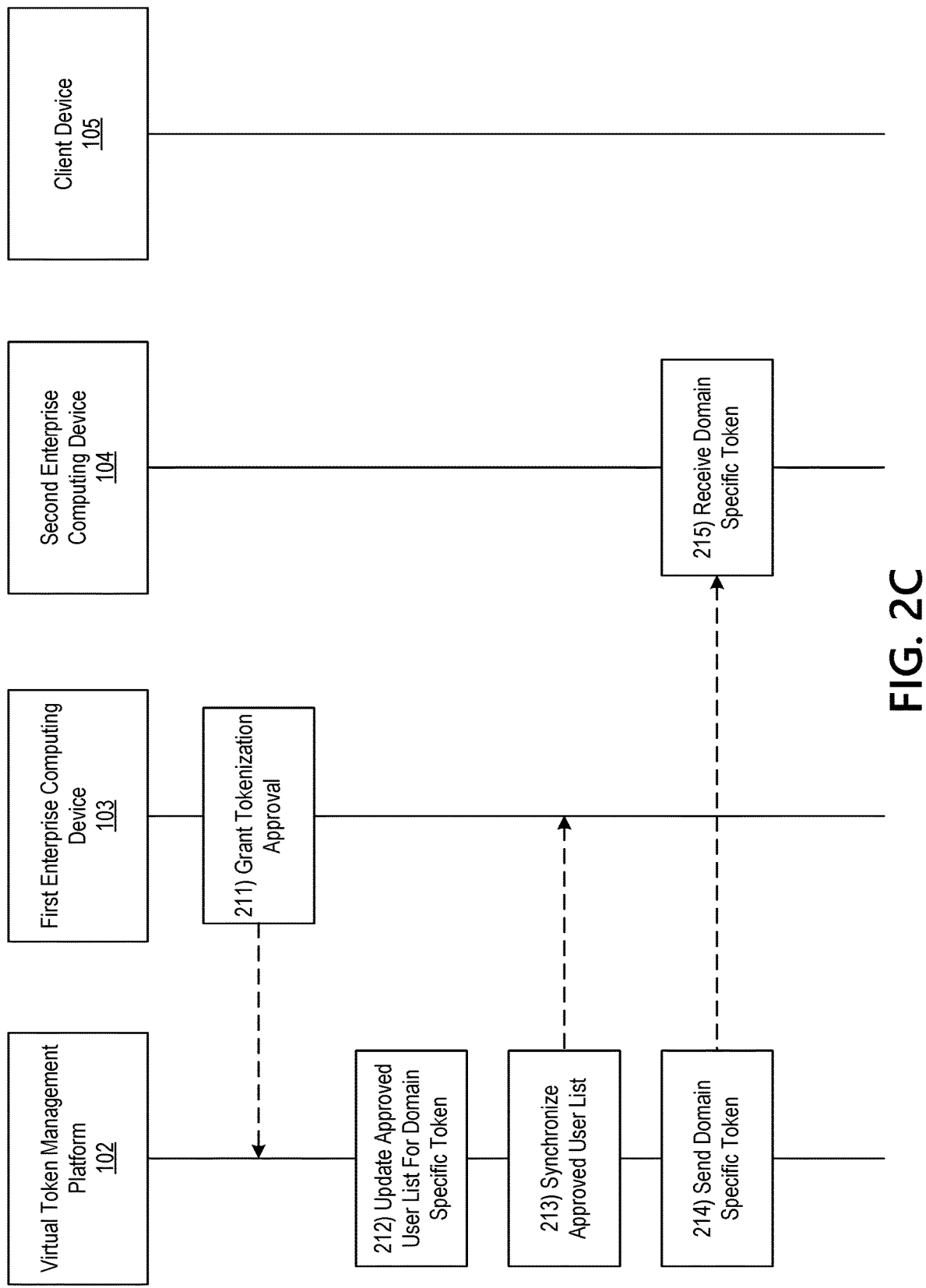

Referring to FIG. 2C, at step 211, the first enterprise computing device 103 may grant tokenization approval to the virtual token management platform 102. In these instances, the virtual token management platform 102 may proceed to step 212. In some instances, the first enterprise computing device 103 may communicate the tokenization approval to the virtual token management platform 102 while the first wireless data connection is established. Otherwise, if the first enterprise computing device 103 does not grant tokenization approval, the virtual token management platform 102 might not proceed.

At step 212, the virtual token management platform 102 may update an approved user list for a domain specific token to include the second enterprise. For example, the virtual token management platform 102 may identify a domain (e.g., device, merchant, ecommerce, and/or other domain) of the second enterprise. In some instances, the virtual token management platform 102 may identify the domain based on information, received from the second enterprise computing device 104, indicating the domain of the second enterprise. Then, the virtual token management platform 102 may identify a domain specific token (e.g., of the virtual tokens generated at step 204) corresponding to the identified domain. Then, the virtual token management platform 102 may add the second enterprise to the approved user list associated with the identified domain specific token.

The approved user list associated with the identified domain specific token may include, for example, a plurality of different enterprises all corresponding to a common domain (e.g., merchant domain, device domain, ecommerce domain, and/or other domains). For example, the approved user list may be a list for the domain specific token, specifying enterprises authorized to use the domain specific token. Accordingly, rather than assigning virtual tokens to represent card information on a one to one basis, a single virtual token may be used to represent all card information associated with a given enterprise (e.g., the first enterprise). In doing so, the number of tokens needed may be reduced, thus preventing (or at least slowing) depletion of all available virtual tokens, of which a finite number may be available (e.g., due to numeric constraints on the virtual tokens, which may, e.g., be numbers that include a particular amount of digits, or the like). Furthermore, rather than assigning ownership of the tokens to the token users (e.g., the enterprises) themselves, a single enterprise (e.g., a card network) of the virtual token management platform 102 may maintain custody of the tokens, while granting token users/ enterprises permission to use them.

At step 213, the virtual token management platform 102 may synchronize the approved user list associated with the identified domain specific token with the first enterprise computing device 103. For example, the virtual token management platform 102 may synchronize the approved user list associated with the identified domain specific token via the communication interface 113 and while the first wireless data connection is established. In doing so, the virtual token management platform 102 may enable the first enterprise computing device 103 to provide authorization/validation services, based on virtual tokens, by referencing the approved user list.

At step 214, the virtual token management platform 102 may send the domain specific token to the second enterprise computing device 104. For example, the virtual token management platform 102 may send the domain specific token to the second enterprise computing device 104 via the communication interface 113 and while the third wireless data connection is established.

At step 215, the second enterprise computing device 104 may receive the domain specific token sent at step 214. For example, the second enterprise computing device 104 may receive the domain specific token while the third wireless data connection is established.

Figure 2D:
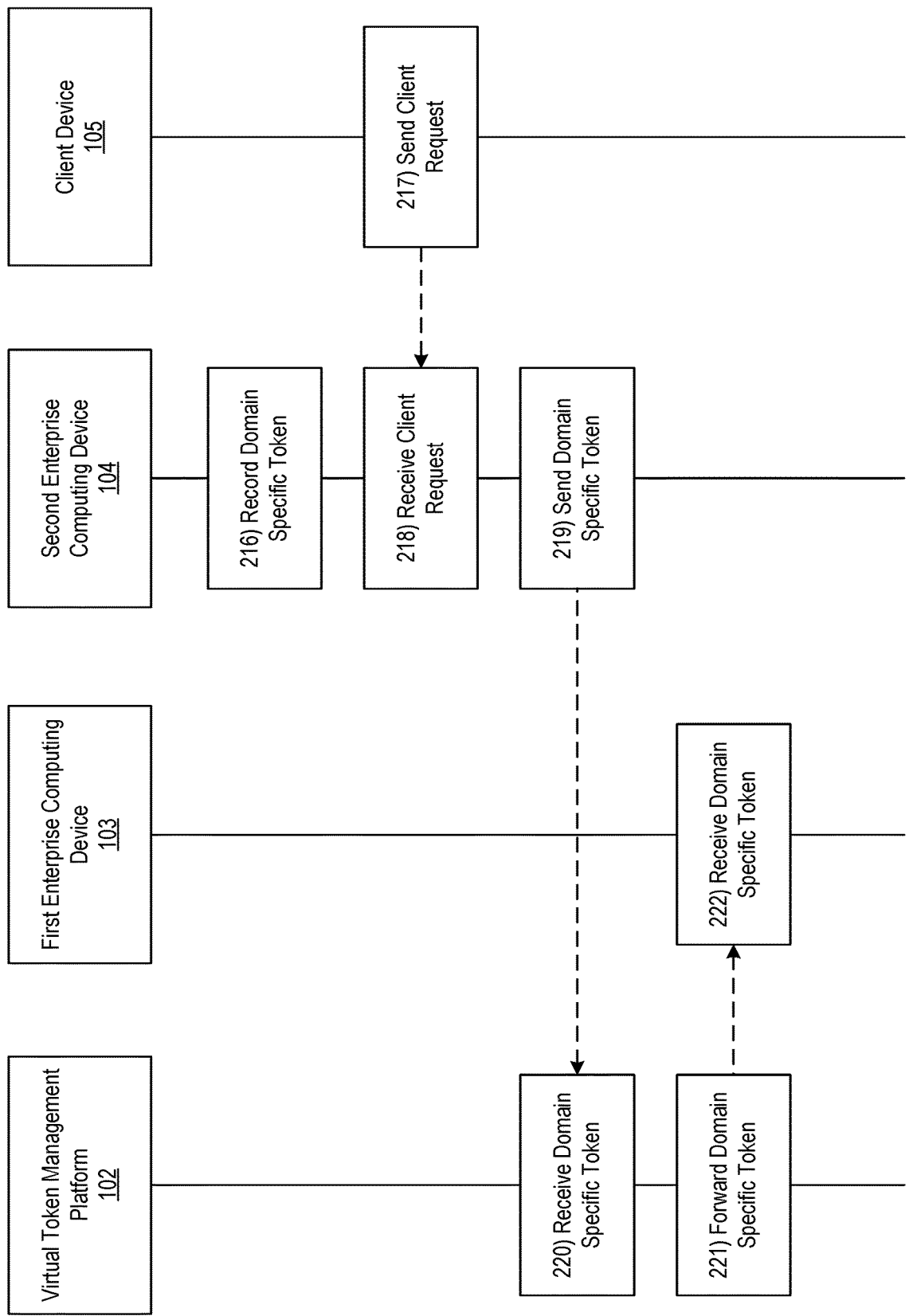

Referring to FIG. 2D, at step 216, the second enterprise computing device 104 may record the domain specific token. For example, the second enterprise computing device 104 may store the domain specific token for future use. In some instances, the second enterprise computing device 104 may record the domain specific token along with a portion of the card information (e.g., such as the last four digits of the card, or the like).

Although steps 205-216 describe the process of assigning a single domain specific token to an enterprise on behalf of a client, any number of enterprise/client combinations (e.g., corresponding to the same domain) may be added to the domain specific token without departing from the scope of the disclosure. Similarly, enterprises (e.g., of different domains), may be assigned different domain specific tokens without departing from the scope of the disclosure. In either instance, similar actions to those described above may be performed.

At step 217, the client device 105 may send a client request to the second enterprise computing device 104. For example, the client device 105 may send a client request to the second enterprise computing device 104 while the second wireless data connection is established. In some instances, in sending the client request, the client device 105 may send a request to process a transaction and/or other event using the card (or other financial instrument) specified in the card information (e.g., at step 206).

At step 218, the second enterprise computing device 104 may receive the client request, sent at step 217. For example, the second enterprise computing device 104 may receive the client request while the second wireless data connection is established.

At step 219, the second enterprise computing device 104 may send the domain specific token, stored at step 216, to the virtual token management platform 102. In some instances, the second enterprise computing device 104 may also send the client request, a request to process the client request, and/or information of the client request. In some instances, the second enterprise computing device 104 may send the domain specific token to the virtual token management platform 102 while the third wireless data connection is established. In some instances, the second enterprise computing device 104 may send the client request and/or other information in response to receiving the client request.

At step 220, the virtual token management platform 102 may receive the domain specific token sent at step 219. For example, the virtual token management platform 102 may receive the domain specific token via the communication interface 113 and while the third wireless data connection is established.

At step 221, the virtual token management platform 102 may forward the domain specific token to the first enterprise computing device 103. For example, the virtual token management platform 102 may forward the domain specific token to the first enterprise computing device 103 via the communication interface 113 and while the first wireless data connection is established. In some instances, the virtual token management platform 102 may also forward an identifier of the second enterprise and/or a request to process the client request. In some instances, the virtual token management platform 102 may validate the domain specific token (e.g., as a first tier of validation) before passing it to the first enterprise computing device 103 (e.g., as a second tier of validation). For example, the virtual token management platform 102 may use validation techniques similar to those described below with regard to the first enterprise computing device 103 at step 223.

At step 222, the first enterprise computing device 103 may receive the domain specific token sent at step 221. For example, the first enterprise computing device 103 may receive the domain specific token while the first wireless data connection is established.

Figure 2E:
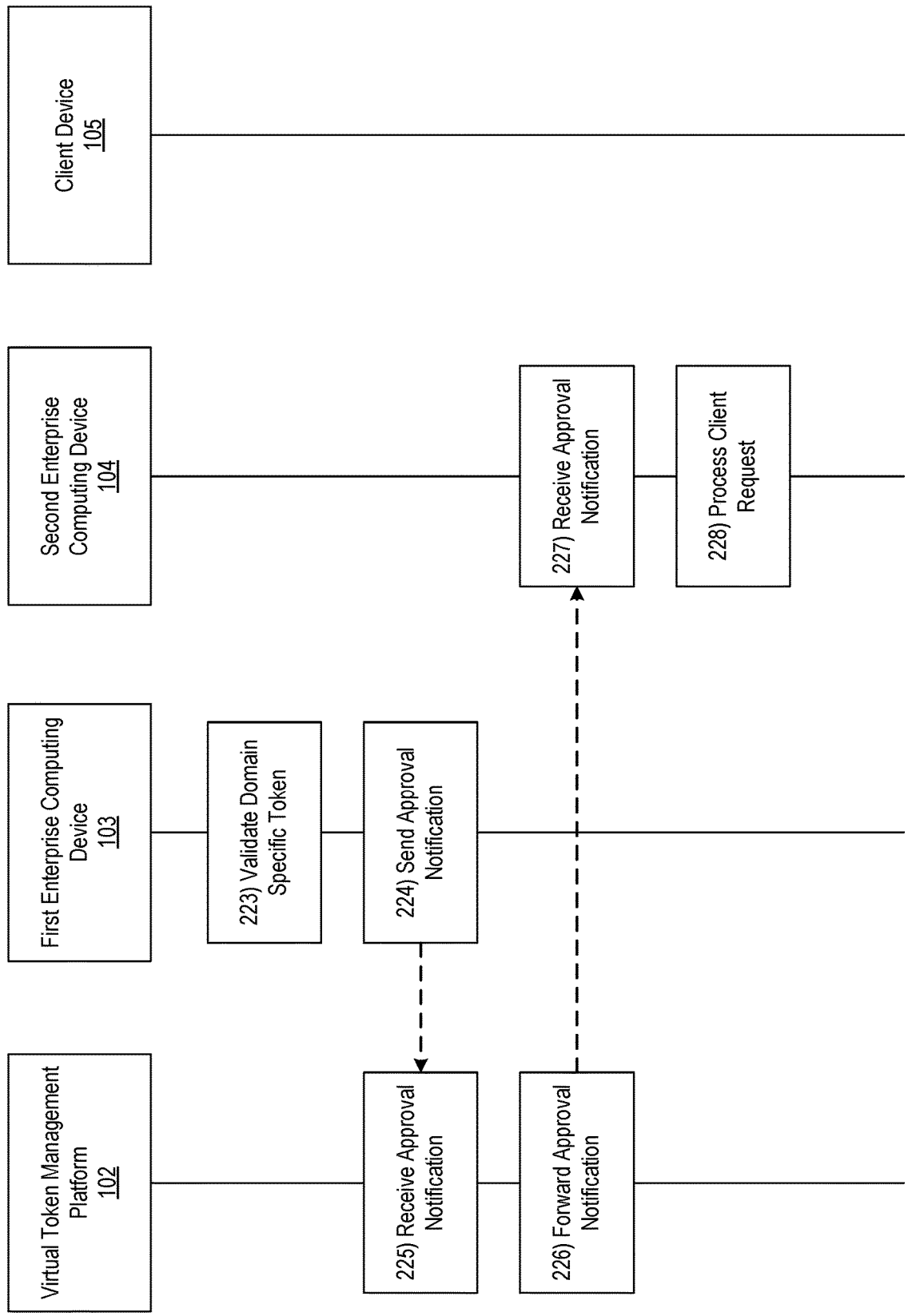

Referring to FIG. 2E, at step 223, the first enterprise computing device 103 may validate the domain specific token. For example, the first enterprise computing device 103 may reference the approved users list (stored at step 213) for the domain specific token received at step 222, and may identify whether or not the second enterprise is listed as an approved user. If the second enterprise is not listed as an approved user, the first enterprise computing device 103 may proceed to step 229. If the second enterprise is listed as an approved user, the first enterprise computing device 103 may proceed to step 224.

At step 224, the first enterprise computing device 103 may send an approval notification to the virtual token management platform 102. For example, the first enterprise computing device 103 may send a notification indicating that the domain specific token has been approved for the second enterprise. In some instances, the first enterprise computing device 103 may send the approval notification to the virtual token management platform 102 while the first wireless data connection is established.

At step 225, the virtual token management platform 102 may receive the approval notification from the enterprise computing device 103 (e.g., sent at step 224). For example, the virtual token management platform 102 may receive the approval notification via the communication interface 113 and while the first wireless data connection is established.

At step 226, the virtual token management platform 102 may forward the approval notification to the second enterprise computing device 104. For example, the virtual token management platform 102 may forward the approval notification to the second enterprise computing device 104 via the communication interface 113 and while the third wireless data connection is established. In some instances, the virtual token management platform 102 may also send one or more commands directing the second enterprise computing device 104 to display the approval notification. In some instances, the virtual token management platform 102 may send one or more commands directing the second enterprise computing device 104 to process the client request, which may, e.g., cause the second enterprise computing device 104 to process the client request.

At step 227, the second enterprise computing device 104 may receive the approval notification sent at step 226. For example, the second enterprise computing device 104 may receive the approval notification while the third wireless data connection is established. In some instances, the virtual token management platform 102 may also receive the one or more commands directing the second enterprise computing device 104 to display the approval notification. In some instances, based on or in response to the one or more commands directing the second enterprise computing device 104 to display the approval notification, the second enterprise computing device 104 may display the approval notification. For example, the second enterprise computing device 104 may display a graphical user interface similar to graphical user interface 305, which is illustrated in FIG. 3.

At step 228, the second enterprise computing device 104 may process the client request. In some instances, the second enterprise computing device 104 may process the client request based on the approval notification and/or commands from the virtual token management platform 102 directing it to do so. For example, the second enterprise computing device 104 may process an order, provide services, and/or otherwise process the client request. After processing of the client request is complete, the method may end and/or proceed to step 233.

Figure 2F:
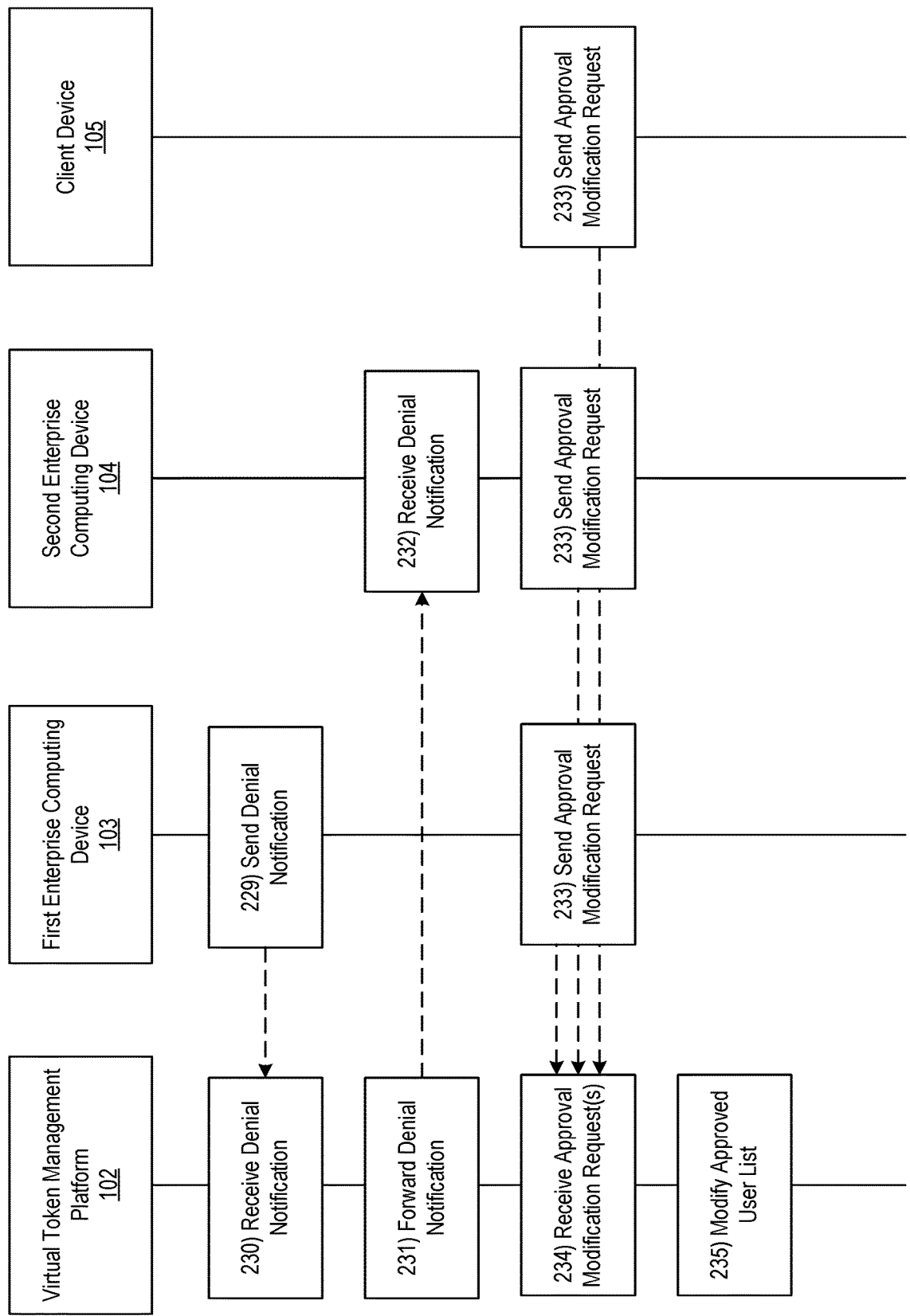

Returning to step 223, if the first enterprise computing device 103 was unable to successfully validate the domain specific token, the first enterprise computing device 103 may proceed to step 229. Referring to FIG. 2F, at step 229, first enterprise computing device 103 may send a denial notification to the virtual token management platform 102 (e.g., indicating that the second enterprise is not an approved user of the domain specific token). In some instances, the first enterprise computing device 103 may send the denial notification to the virtual token management platform 102 while the first wireless data connection is established.

At step 230, the virtual token management platform 102 may receive the denial notification sent at step 229. For example, the virtual token management platform 102 may receive the denial notification via the communication interface 113 and while the first wireless data connection is established.

At step 231, the virtual token management platform 102 may forward the denial notification (received at step 230) to the second enterprise computing device 104. For example, the virtual token management platform 102 may forward the denial notification to the second enterprise computing device 104 while the third wireless data connection is established and via the communication interface 113. In some instances, the virtual token management platform 102 may also send one or more commands directing the second enterprise computing device 104 to display the denial notification.

At step 232, the second enterprise computing device 104 may receive the denial notification (sent at step 231) from the virtual token management platform 102. For example, the second enterprise computing device 104 may receive the denial notification while the third wireless data connection is established. In some instances, the second enterprise computing device 104 may also receive the one or more commands directing the second enterprise computing device 104 to display the denial notification. In one or more instances, based on or in response to the one or more commands directing the second enterprise computing device 104 to display the denial notification, the second enterprise computing device 104 may display the denial notification. For example, the second enterprise computing device 104 may display a graphical user interface similar to graphical user interface 405, which is illustrated in FIG. 4.

At step 233, the first enterprise computing device 103, second enterprise computing device 104, and/or client device 105 may send a request to modify the approved users list for the domain specific token. For example, the first enterprise computing device 103, second enterprise computing device 104, and/or client device 105 may send a request to remove a user (e.g., the second enterprise) from the approved users list, lock the domain specific token, and/or perform other actions. In some instances, the first enterprise computing device 103, second enterprise computing device 104, and/or client device 105 may send the request to modify the approved users list while a wireless data connection is established with the virtual token management platform 102.

At step 234, the virtual token management platform 102 may receive the request to modify the approved users list for the domain specific token, sent at step 233. For example, the virtual token management platform 102 may receive the request to modify the approved users list via the communication interface 113 and while a wireless data connection is established with the virtual token management platform 102, first enterprise computing device 103, and/or second enterprise computing device 104.

At step 235, the virtual token management platform 102 may modify the approved user list for the domain specific token according to the request received at step 234. For example, if a request to remove the second enterprise from the approved users list was received, the virtual token management platform 102 may remove the second enterprise from the approved users list accordingly. In doing so, the virtual token management platform 102 may cause authorization for the domain specific token by the second enterprise to be denied, without affecting the authorization of any remaining enterprises on the approved users list. As a practical use case, this may occur if a card is being removed from an enterprise account or service. If a request to lock the domain specific token was received, the virtual token management platform 102 may temporarily remove the second enterprise from the approved users list until expiration of the lockout period. In doing so, the virtual token management platform 102 may cause the authorization for use of the domain specific token by the second enterprise to be denied, while causing the authorization for use of the domain specific token by other enterprises included on the approved users list to continue to be approved. Then, the virtual token management platform 102 may add the second enterprise back to the approved users list upon expiration of the lockout period, based on receipt of a request to resume the authorization for the second enterprise to use the domain specific token, and/or otherwise. As a practical use case, this may be performed, for example, when an individual temporarily locks a card using their mobile device. Additionally or alternatively, either suspending or locking the authorization may be initiated by a financial institution (e.g., such as the first enterprise) based on detected malicious activity. In either instance, where authorization is permanently or temporarily suspended, the domain specific token may be deleted from the token user (e.g., the second enterprise computing device 104) as well.

Figure 2G:
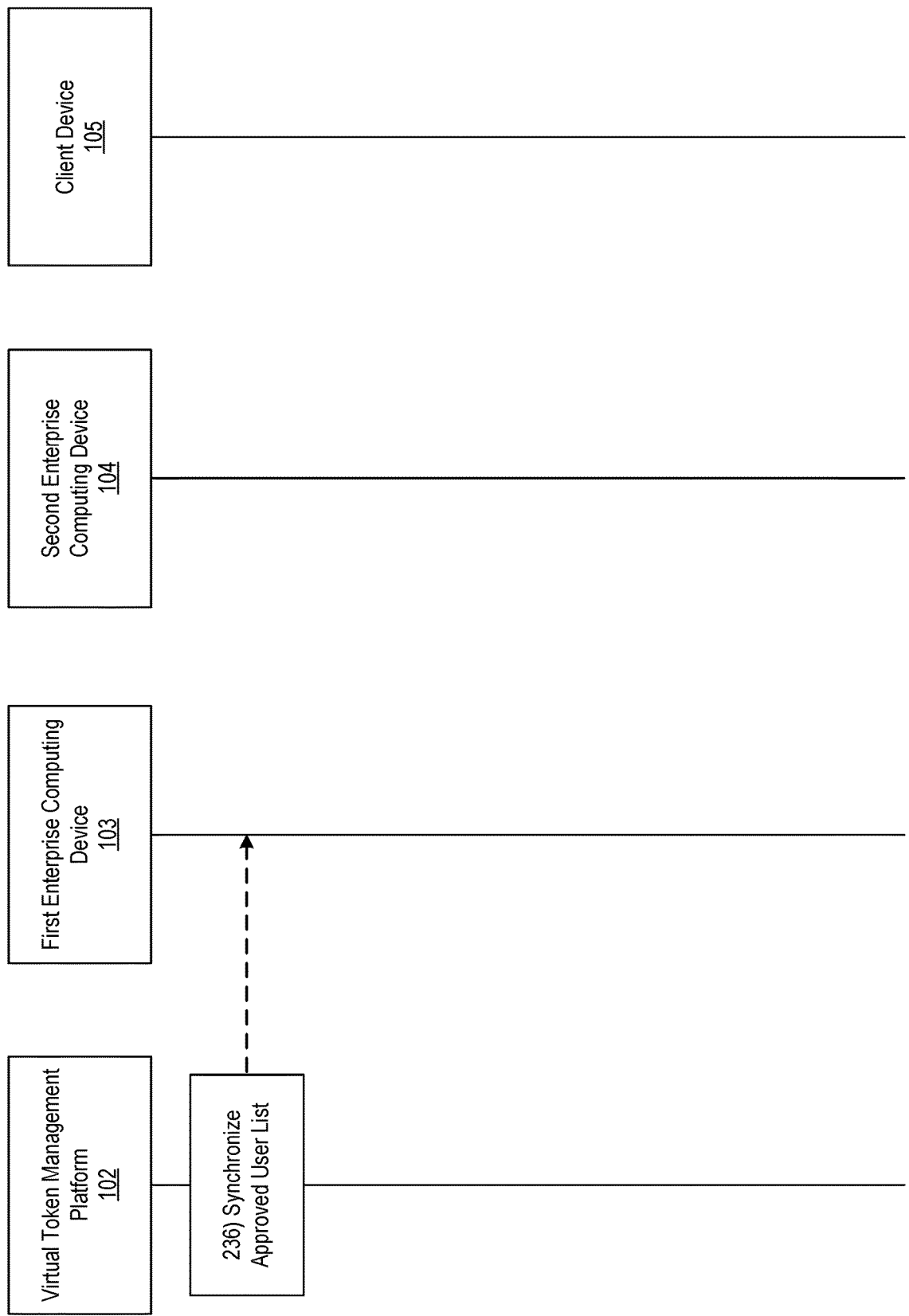

Referring to FIG. 2G, at step 236, the virtual token management platform 102 may synchronize the modified approved user list for the domain specific token with the first enterprise computing device 103. For example, the virtual token management platform 102 may synchronize the modified approved user list with the first enterprise computing device 103 via the communication interface 113 and while the first wireless data connection is established.

Although modification of the approved users list is described with regard to steps 233-236, such modification may occur at any time throughout the above described event sequence without departing from the scope of the disclosure.

Figure 5:
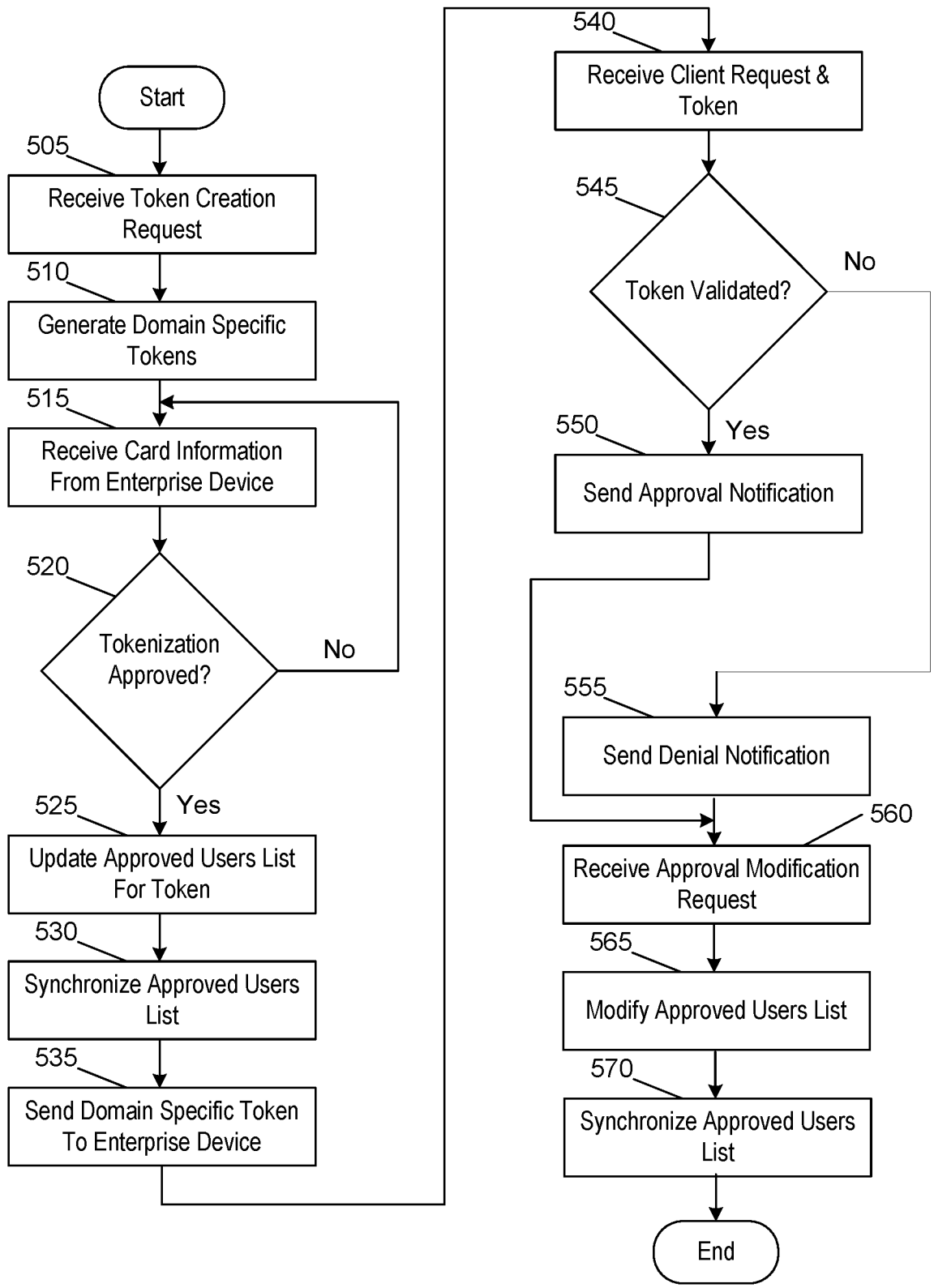
FIG. 5 depicts an illustrative method for generating and managing domain specific tokens to improve token efficiency in accordance with one or more example embodiments.

FIG. 5 depicts an illustrative method for generating and managing domain specific tokens to improve token efficiency in accordance with one or more example embodiments. At step 505, a computing platform may receive a token creation request. At step 510, the computing platform may generate domain specific tokens. At step 515, the computing platform may receive card information from an enterprise device. At step 520, the computing platform may identify whether or not tokenization of the card information is approved. If such tokenization is not approved, the computing platform may return to step 515. Otherwise, if such tokenization is approved, the computing platform may proceed to step 525.

At step 525, the computing platform may update an approved users list for a domain specific token corresponding to the domain of the enterprise (e.g., to include the enterprise). At step 530, the computing platform may synchronize the approved users list with the enterprise device. At step 535, the computing platform may send the domain specific token to the enterprise device. At step 540, the computing platform may receive a client request along with the domain specific token. At step 545, the computing platform may identify whether or not the domain specific token is validated for the enterprise (e.g., whether or not the enterprise is an approved user). If the enterprise is not an approved user, the computing platform may proceed to step 555 to send a denial notification to the enterprise device. If the enterprise is an approved user, the computing platform may proceed to step 550 to send an approval notification to the enterprise device.

Once either the approval or denial notification has been sent, the computing platform may proceed to step 560. At step 560, the computing platform may receive a request to modify the approved users list. At step 565, the computing platform may modify the approved users list based on the request. At step 570, the computing platform may synchronize the modified approved users list with the enterprise device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   generate a plurality of domain specific tokens, including a first domain specific token, wherein each domain specific token corresponds to a card number and has an approved users list;
   receive, from a first enterprise device corresponding to a first enterprise, card information of a card;
   identify that tokenization of the card information is approved by a second enterprise corresponding to the card;
   based on identifying that the tokenization is approved, modify the approved users list for the first domain specific token to include the first enterprise, wherein the first enterprise corresponds to a first domain of the first domain specific token, and wherein the approved users list includes at least one other enterprise corresponding to the first domain; and
   send, to the first enterprise device, the first domain specific token, wherein the first domain specific token is configured for storage at the first enterprise device along with at least a portion of the card information, and wherein the computing platform is configured to validate an event processing request based on receipt of the first domain specific token from the first enterprise device or the at least one other enterprise corresponding to the first domain.

2. The computing platform of claim 1, wherein the first enterprise comprises a token user and the second enterprise comprises a financial institution.

3. The computing platform of claim 1, wherein the plurality of domain specific tokens are generated in response to a request from the second enterprise.

4. The computing platform of claim 1, wherein the first domain specific token corresponds to one of: a device domain or a merchant domain.

5. The computing platform of claim 1, wherein the memory stores additional computer-readable instructions that, when executed by the at least one processor, cause the computing platform to:
receive, from the first enterprise device and along with the card information, domain information identifying that the first enterprise corresponds to the first domain.

6. The computing platform of claim 1, wherein the card information identifies that the second enterprise corresponds to the card.

7. The computing platform of claim 1, wherein the memory stores additional computer-readable instructions that, when executed by the at least one processor, cause the computing platform to:
synchronize the approved users list for the first domain specific token with a second enterprise device of the second enterprise.

8. The computing platform of claim 7, wherein the memory stores additional computer-readable instructions that, when executed by the one or more processors, cause the computing platform to:
receive, from the first enterprise device, the first domain specific token and a request for authorization to process the event processing request, wherein the first domain specific token and the request for authorization to process the event processing request are sent by the first enterprise device in response to receiving the event processing request.

9. The computing platform of claim 8, wherein the memory stores additional computer-readable instructions that, when executed by the one or more processors, cause the computing platform to:
forward, to the second enterprise device, the first domain specific token, an identifier of the first enterprise, and the request for authorization to process the event processing request.

10. The computing platform of claim 9, wherein the second enterprise device:
verifies use of the first domain specific token by the first enterprise using the approved users list for the first domain specific token, and
sends, to the computing platform, a notification indicating whether or not the request for authorization to process the event processing request is approved.

11. The computing platform of claim 10, wherein the memory stores additional computer-readable instructions that, when executed by the one or more processors, cause the computing platform to:
based on receiving a notification indicating that the request for authorization to process the event processing request is approved, sending one or more commands directing the first enterprise device to process the event processing request; and
based on receiving a notification indicating that the request for authorization to process the event processing request is not approved, sending one or more commands directing the first enterprise device to display the notification indicating that the request for authorization to process the event processing request is not approved.

12. The computing platform of claim 1, wherein the memory stores additional computer-readable instructions that, when executed by the at least one processor, cause the computing platform to:
receive a request to revoke authorization for the first enterprise to use the first domain specific token; and
remove the first enterprise from the approved users list for the first domain specific token, wherein removing the first enterprise from the approved user list for the first domain specific token causes authorization for use of the first domain specific token by the first enterprise to be denied and causes authorization for use of the first domain specific token by the at least one other enterprise to continue to be approved.

13. The computing platform of claim 1, wherein the memory stores additional computer-readable instructions that, when executed by the at least one processor, cause the computing platform to:
receive a request to temporarily suspend authorization for the first enterprise to use the first domain specific token;
temporarily remove the first enterprise from the approved users list for the first domain specific token, wherein removing the first enterprise from the approved user list for the first domain specific token causes authorization for use of the first domain specific token by the first enterprise to be denied and causes authorization for use of the first domain specific token by the at least one other enterprise to continue to be approved; and
receive a request to resume the authorization for the first enterprise to use the first domain specific token; and
add the first enterprise back to the approved users list for the first domain specific token.

14. A method comprising:
at a computing platform comprising at least one processor, a communication interface, and memory:
generating a plurality of domain specific tokens, including a first domain specific token, wherein each domain specific token corresponds to a card number and has an approved users list;
receiving, from a first enterprise device corresponding to a first enterprise, card information of a card;
identifying that tokenization of the card information is approved by a second enterprise corresponding to the card;
based on identifying that the tokenization is approved, modifying the approved users list for the first domain specific token to include the first enterprise, wherein the first enterprise corresponds to a first domain of the first domain specific token, and wherein the approved user list includes at least one other enterprise corresponding to the first domain; and
sending, to the first enterprise device, the first domain specific token, wherein the first domain specific token is configured for storage at the first enterprise device along with at least a portion of the card information, and wherein the computing platform is configured to validate an event processing request based on receipt of the first domain specific token from the first enterprise device or the at least one other enterprise corresponding to the first domain.

15. The method of claim 14, wherein the first enterprise comprises a token user and the second enterprise comprises a financial institution.

16. The method of claim 14, wherein the plurality of domain specific tokens are generated in response to a request from the second enterprise.

17. The method of claim 14, wherein the first domain specific token corresponds to one of: a device domain or a merchant domain.

18. The method of claim 14, further comprising:
receiving, from the first enterprise device and along with the card information, domain information identifying that the first enterprise corresponds to the first domain.

19. The method of claim 14, wherein the card information identifies that the second enterprise corresponds to the card.

20. One or more non-transitory computer-readable media storing instructions that, when executed by a computing platform comprising at least one processor, a communication interface, and memory, cause the computing platform to:
generate a plurality of domain specific tokens, including a first domain specific token, wherein each domain specific token corresponds to a card number and has an approved users list;
receive, from a first enterprise device corresponding to a first enterprise, card information of a card;
identify that tokenization of the card information is approved by a second enterprise corresponding to the card;
based on identifying that the tokenization is approved, modify the approved users list for the first domain specific token to include the first enterprise, wherein the first enterprise corresponds to a first domain of the first domain specific token, and wherein the approved user list includes at least one other enterprise corresponding to the first domain; and
send, to the first enterprise device, the first domain specific token, wherein the first domain specific token is configured for storage at the first enterprise device along with at least a portion of the card information, and wherein the computing platform is configured to validate an event processing request based on receipt of the first domain specific token from the first enterprise device or the at least one other enterprise corresponding to the first domain.

* * * * *